United States Patent [19]
Tanaka

[11] Patent Number: 5,305,145
[45] Date of Patent: Apr. 19, 1994

[54] WATERPROOF LENS

[75] Inventor: Hitoshi Tanaka, Tokyo, Japan

[73] Assignee: Asahi Kogaku Kogyo Kabushiki Kaisha, Tokyo, Japan

[21] Appl. No.: 907,807

[22] Filed: Jul. 2, 1992

[30] Foreign Application Priority Data

Jul. 4, 1991 [JP] Japan ............................ 3-080991[U]

[51] Int. Cl.$^5$ .................. G02B 7/02; G02B 23/22; G03B 17/08
[52] U.S. Cl. .................... 359/513; 359/511; 359/819; 359/894; 354/64
[58] Field of Search ............... 359/511, 507, 513, 894, 359/819, 822, 823, 824; 354/64

[56] References Cited

U.S. PATENT DOCUMENTS

| | | | |
|---|---|---|---|
| 3,640,424 | 2/1972 | Ando | 359/513 |
| 3,740,114 | 6/1973 | Thompson | 359/513 |
| 4,994,829 | 2/1991 | Tsukamoto et al. | 354/64 |
| 5,056,903 | 10/1991 | Nakamura et al. | 359/513 |
| 5,066,965 | 11/1991 | Tanaka et al. | 354/64 |
| 5,077,567 | 12/1991 | Haraguchi et al. | 354/64 |

FOREIGN PATENT DOCUMENTS 2241345  8/1991  United Kingdom ............... 354/64

Primary Examiner—Jon W. Henry
Attorney, Agent, or Firm—Sandler Greenblum & Bernstein

[57] ABSTRACT

A waterproof lens including a lens frame located within a lens barrel. An inner peripheral flange is provided on the inner periphery of the lens barrel. The waterproof lens also has a tubular member which is detachably mounted to the inner peripheral flange for the purpose of intercepting light in a space between the lens barrel and the lens frame. An elastic waterproof ring is provided on the outer peripheral surface of the tubular member. The waterproof lens further includes a mechanism for sealing the transparent member and the inner peripheral flange in a water-tight manner.

20 Claims, 2 Drawing Sheets

WATERPROOF LENS

BACKGROUND OF THE INVENTION

1. Field of the Invention

The present invention relates to a waterproof lens having a transparent member mounted to a front end of a lens barrel in a water-tight fashion.

2. Description of Related Art

There is known a waterproof camera which does not allow water to go into the camera and can take pictures in shallow water. There is also known a water-resistant camera which resists against the penetration of drops of water or rain into the camera. Such a known waterproof or water-resistant camera includes a light intercepting flange which is provided on the inner peripheral edge of the front end of a lens barrel to intercept light between the inner periphery of the lens barrel and a taking lens. The light intercepting flange extends to the outer peripheral surface of the taking lens from the inner periphery of the lens barrel. Consequently, the space between the inner periphery of the lens barrel and the taking lens is closed by the light intercepting flange when the camera is assembled. Accordingly, it is impossible to adjust an internal mechanism of the camera without disassembling the camera.

In particular, in the case of a water-resistant compact camera having a built-in zoom lens, it is necessary to provide a means for effecting the focus adjustment in order to increase the light sensitivity of the optical system of such a small camera after the camera has been assembled because an error in adjustment may occur in the initial assembly process. However, it is impossible to insert, for example, a special adjusting jig into the lens barrel from the front end thereof to effect focus adjustment after the camera is assembled because of obstructions by the light intercepting flange, for example, inside the camera.

SUMMARY OF THE INVENTION

The primary object of the present invention is to provide a waterproof camera in which the inside of the taking lens can be exposed at the front portion thereof (i.e., at the forward end of the optical axis of the taking lens) even after the assembly of the camera is completed.

Note that the term "waterproof" referred to in the present invention is defined to include both "waterproof" meaning prevention of penetration of water and "water-resistant" meaning that drops of water and rain are repelled.

To achieve the object mentioned above, according to the present invention, there is provided a waterproof lens comprising a lens barrel having an inner peripheral flange, a lens frame located within the lens barrel, a tubular member which occupies a space between the inner peripheral flange and the lens frame and which is detachably mounted to the inner flange, a mechanism which seals the inner peripheral flange and the transparent member in a watertight manner.

According to another aspect of the present invention, in a waterproof lens including a transparent member which is mounted to a front end of a lens barrel through an elastic water seal ring in a water tight fashion, the lens barrel is provided with an inner peripheral flange, and the improvement comprises a tubular member which is detachably mounted to the inner peripheral flange of the lens barrel and which is made of a separate piece from the lens barrel. The elastic water seal ring is held between the tubular member and the inner peripheral flange of the lens barrel.

According to still another aspect of the present invention, there is provided a waterproof lens comprising a lens barrel which is provided on an inner peripheral surface thereof with an inner peripheral light intercepting portion which intercepts light in a space between the lens barrel and a lens frame wh accommodated in the lens barrel, and wherein the inner peripheral light intercepting portion comprises an internal peripheral flange integrally formed on the inner peripheral surface of the lens barrel, and a tubular member which is made apart from the lens barrel.

Preferably, a holding ring is screw-engaged at the front end of the lens barrel. The transparent member, which can be made, for example, of transparent glass, is held by the holding ring and depressed against the elastic water seal ring.

The lens frame is, for example, a front lens frame which holds a front lens unit. The front lens frame is provided on the outer peripheral surface thereof with an engaging groove in which a connecting ring is fitted with a predetermined holding force.

In a preferred embodiment, the provision is made for an AF/AE unit having an AF driving lever which is actuated to rotate the connecting ring about the optical axis so as to drive the front lens unit in the forward optical axis direction.

When the tubular member is removed together with the transparent member, the front lens frame can be rotated by a focus adjusting jig which can be inserted in the lens barrel at the front end thereof to exert a rotational force larger than the predetermined holding force on the lens barrel.

Preferably, the tubular member is provided with a light intercepting portion for intercepting light in a space between the lens barrel and the lens frame when the tubular member is mounted to the inner peripheral flange of the lens barrel, and an outer surface on which the elastic waterproof ring can be fitted.

The present disclosure relates to subject matter contained in Japanese utility model application No. 3-80991 (filed on Jul. 4, 1991) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
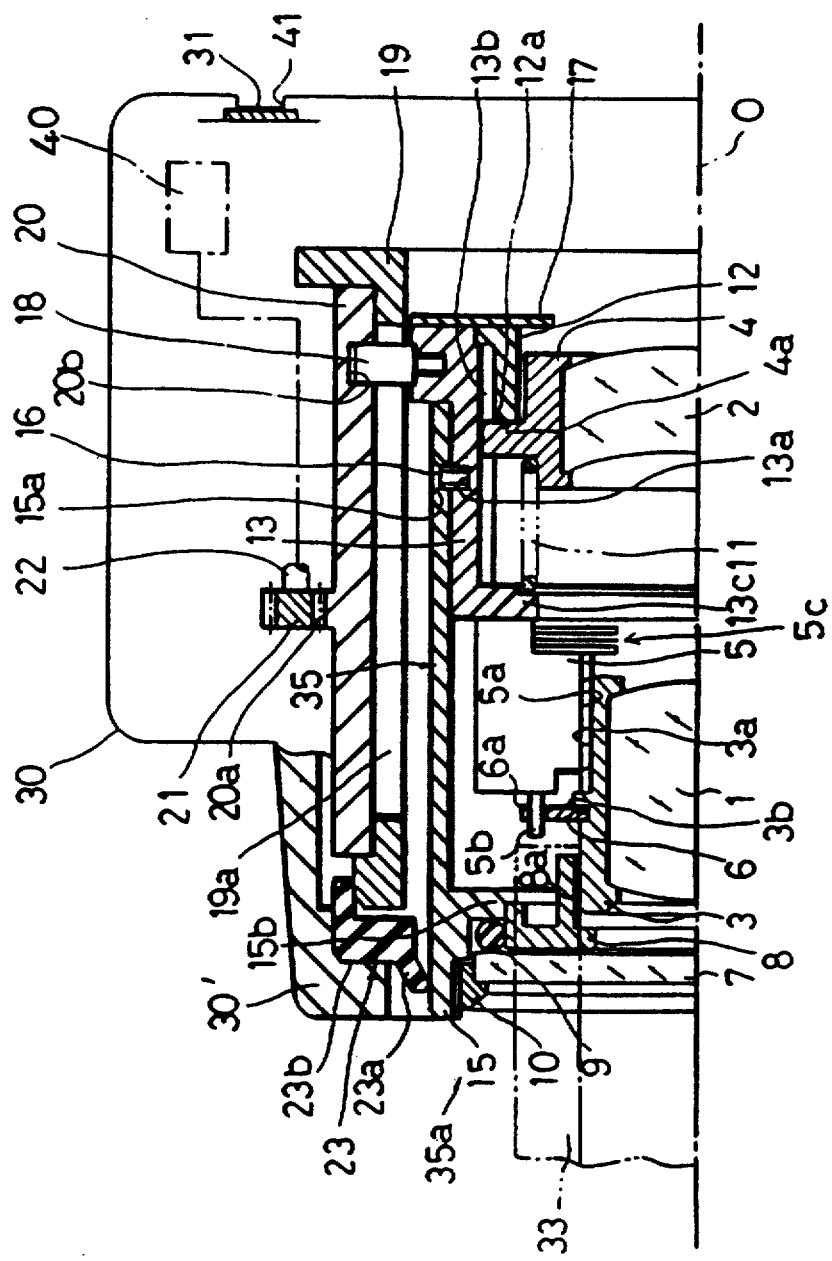
FIG. 1 is a schematic sectional view of an upper half of a camera having a taking lens, with respect to an optical axis of the camera, according to the present invention; and, FIG. 2 is a sectional view of a holding mechanism of a waterproof protection glass which constitutes a main element of the present invention.
Figure 2:
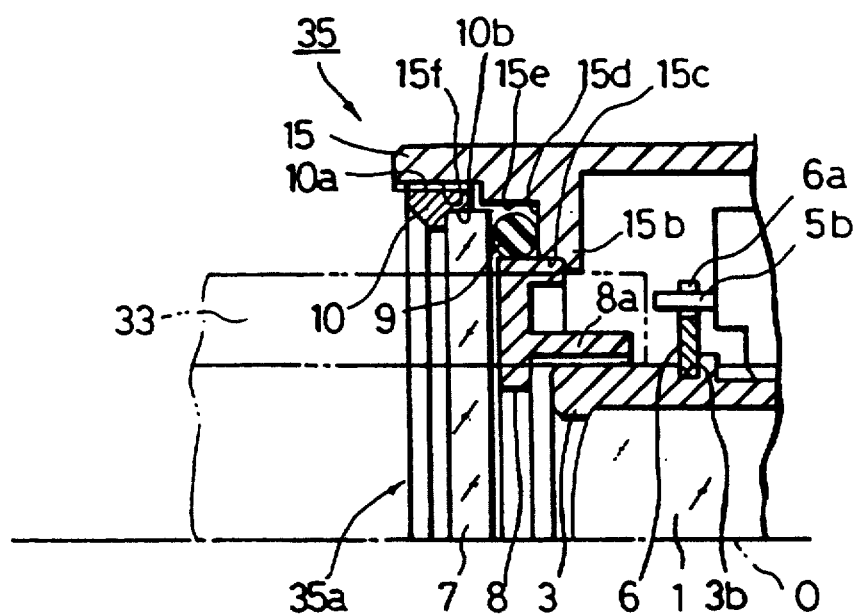

FIG. 1 shows an upper half of a camera having a taking lens (waterproof lens) 35, shown in a shortest focal length position as a result of a zooming operation.

The taking lens 35 is inserted in a waterproof camera body 30 assembled in a water-tight fashion and movable in an optical axis direction. The taking lens 35 has a movable lens barrel 15 in which a group of variable power lenses having a front lens unit 1 and a rear lens unit 2 is provided.

The variable power lens group has a moving frame 13 to which an AF/AE unit 5 is attached at the front end of the moving frame 13. The AF/AE unit 5 has a helicoid female screw portion 5a formed on the inner peripheral surface thereof, an AF driving lever 5b extending in the forward direction of the optical axis, and a shutter 5c. The female helicoid 5a is screw-engaged by a male helicoid 3a formed on the outer peripheral surface of the rear portion of a front lens frame 3 which supports the front lens unit 1 on the inner surface thereof.

The front lens frame 3 is provided on the outer peripheral surface thereof with an engaging groove 3b in which a connecting ring 6 having a recess 6a in which the AF driving lever 5b is engaged is fitted with a predetermined holding force. Namely, when the lens frame 3 is rotated relative to the connecting ring 6 which is immovably held by an external force larger than the predetermined holding force, a relative positional relationship between the connecting ring 6 and the front lens frame 3 changes, so that a change in the relative position of the front lens unit 1 to the rear lens unit 2 takes place to thereby adjust the focus.

The AF/AE unit 5 rotates the AF driving lever 5b for example in a clockwise direction as viewed from the front elevational direction of the camera in FIG. 1, in accordance with object distance data calculated by a controller (not shown) in the camera body to advance the front lens unit 1 in the optical axis direction by the necessary displacement to arrive at an appropriate focal position. Also, the AF/AE unit 5 drives the shutter 5c to obtain a desired diaphragm value at a predetermined shutter speed in accordance with exposure data calculated by the controller.

The moving frame 13 has a guide groove 13b formed on the inner peripheral surface thereof and a bent front end 13c. A rear lens frame 4 which supports therein the rear lens unit 2 is fitted in the moving frame 13. The rear lens frame 4 is provided on the outer peripheral surface thereof with a guide pin 4a which is fitted in the guide groove 13b of the moving frame 13, so that when the guide pin 4a is moved in and along the guide groove 13b, the rear lens unit 2 can be moved in the optical axis direction.

A compression spring 11 is provided between the bent front end 13c of the moving frame 13 and the rear lens frame 4 to bias the rear lens frame 4 in the optical axis direction to thereby press the guide pin 4a against a driving cylindrical cam 12 located behind the rear lens frame 4.

The cylindrical cam 12 which is provided in the rear portion of the moving frame 13 has a cam surface 12a which engages with the guide pin 4a of the rear lens frame 4 in a slidable manner to move the rear lens unit 2 with respect to the moving frame 13 in the optical axis direction. The moving frame 13 has a stop plate 17 secured to the rear portion thereof to restrict the backward movement of the driving cylindrical cam 12 in the optical axis direction. A plurality of threaded holes 13a corresponding to threaded holes 15a formed on the rear portion of the movable lens barrel 15 are formed on the outer surface of the moving frame 13, so that connecting screws 16 are screwed in the corresponding threaded holes 13a and 15a to secure the moving frame 13 and the movable lens barrel 15.

Guide pins 18 are inserted in and secured to corresponding holes formed in the outer surface of the rear portion of the moving frame 13. An immovable frame 19 secured to the camera body 30 is provided on the inner surface thereof with linear guide grooves 19a extending in the optical axis direction. The guide pins 18 are slidably engaged in the linear guide grooves 19a.

A driving cam ring 20 is provided on the outer peripheral surface thereof with a peripheral gear portion 20a which is engaged by a pinion 21 connected to a zooming motor 40.

A waterproof ring 23 is provided between the inner peripheral surface of the immovable lens barrel 30' of the camera body 30 and the outer peripheral surface of the movable lens barrel 15. The waterproof ring 23 has a contact portion 23b which comes into close contact with the inner surface of the immovable lens barrel 30' and a tongue 32b which comes into slidable contact with the outer peripheral surface of the movable lens barrel 15 in a water-tight fashion to prevent drops of water or foreign matter from entering the space between movable lens barrel 15 and the immovable lens barrel 30'.

In a lens opening 35a of the movable lens barrel 15 are formed an inner peripheral flange 15b integral therewith, an annular supporting portion 15c in which a tubular member 8 is fitted and supported, a close contact wall portion 15d which comes into contact with the rear surface of a waterproof O-ring (elastic waterproof ring) 9 to restrict the backward movement of the O-ring 9, a stepped portion 15e in which the O-ring 9 is received, and a female threaded portion 15f, respectively.

The O-ring 9 is fitted on and held by the front portion of the tubular member 8. The tubular member 8 has a light intercepting flange 8a which extends rearwardly in the optical axis direction above the front lens frame 3 to intercept light which would otherwise reach a space between the movable lens barrel 15 and a front lens frame 3. The light intercepting flange 8a covers the front end of the front lens frame 3 when the outer peripheral surface of the light intercepting flange 8a is fitted in the annular supporting portion 15c.

In the illustrated embodiment, the light intercepting flange 8a is formed integral with the tubular member 8 which is made of a separate piece. Namely, the light intercepting flange 8a is separate from the movable lens barrel 15. If the light intercepting flange 8a was integrally formed on the inner peripheral surface of the movable lens barrel 15, contrary to the illustrated embodiment, the exposure (uncovering) of the front lens frame 3 and the front lens unit 1 from the lens opening 35a could be restricted. However, in the illustrated embodiment, the front lens frame 3 and the front lens unit 1 can be largely uncovered from the lens, opening 35a by detaching the tubular member 8 which is made separate from the inner peripheral flange 15b of the movable lens barrel 15.

A holding ring 10 is provided on the outer peripheral surface thereof with a threaded portion (male screw) 10a which can be screw-engaged by the female screw 15f of the movable lens barrel 15. The holding ring 10 has a stepped portion 10b formed on the inner surface thereof, in which a circular waterproof protection glass 7 is fitted. When the male screw 10a of the holding ring 10 is screwed in the female screw 15f, the waterproof O-ring 9 provided on the front end of the tubular member 8 to correspond to the stepped portion 15e of the movable lens barrel 15 is depressed against the close contact wall portion 15d by the waterproof protection glass 7. Consequently, the lens opening 35a of the movable lens barrel 15 is maintained in a water-tight state. In an alternative, it is possible to make the waterproof protection glass 7 and holding ring 10 as an integral unit.

A focus adjusting jig 33 which is in the form of a cylinder can be fitted on the front end of the front lens frame 3 to clamp the latter. The clamped front lens frame 3 is rotated by the focus adjusting jig 33 in the clockwise or counterclockwise direction to move the front lens unit 1 in the optical axis direction with respect to the female helicoid 5a to thereby adjust the focus.

An air permeable and water impermeable filter 31 is provided in an air bleeding hole 41 formed in the rear end of the camera body 30. The air permeable and water impermeable filter 31 is made of a commercially available material, such as porous ethylene tetrafluoride resin through which an air permeates but no water permeates.

The taking lens 35 of a waterproof camera as constructed above operates as follows.

When the zooming motor 40 is driven, the rotation thereof is transmitted to the movable lens barrel 15 through a drive transmission rod 22, the driving pinion 21, the driving cam ring 20, the guide pins 18 and the moving frame 13, etc. Consequently, the movable lens barrel 15 is moved in the optical axis direction. The driving cylindrical cam 12 has a guide pin (not shown) which is engaged in a guide groove (not shown) provided on the driving cam ring 20 and separate from the guide groove 20b thereof, so that when the driving cam ring 20 rotates, the driving cylindrical cam 12 is rotated in accordance with the axial displacement of the movable lens barrel 15 in the optical axis direction to move the rear lens unit 2 in the same direction.

To readjust the focus, for example upon maintenance of the camera, the holding ring 10 is rotated in a predetermined detachment direction, so that the holding ring 10 is disengaged from the female screw 15f of the movable lens barrel 15 together with the waterproof protection glass 7 which is fitted in the stepped portion 10b of the holding ring 10. Thereafter, the tubular member 8 is detached from the annular supporting portion 15c and thus from the lens opening 35a, together with the O-ring 9 which is fitted on the tubular member 8.

Consequently, the front lens unit 1 and the front lens frame 3 are uncovered from the lens opening 35a, and accordingly, the focus adjusting jig 33 can be inserted in the lens opening 35a. The front end of the focus adjusting jig 33 is fitted on the front end of the front lens frame 3 to clamp the same with a clamping force larger than the holding force of the connecting ring 6 with respect to the front lens frame 3.

In this state, since the connecting ring 6 is held so as not to rotate by the AF driving lever 5b of the AF/AE unit 5 which is not driven, the front lens frame 3 can be rotated with respect to the connecting ring 6 by rotating the focus adjusting jig 33 in a predetermined direction. As a result, a relative position of the connecting ring 6 to the front lens frame 3 changes to move the front lens frame 3 with respect to the female helicoid 5a. Consequently, a change in the relative position of the front lens unit 1 and the rear lens unit 2 takes place to adjust the focus.

When the focus adjustment is completed, the focus adjusting jig 33 is removed from the front lens frame 3, and then, the tubular member 8 having thereon the O-ring 9 is fitted in the annular supporting portion 15c and on the front lens frame 3. Thereafter, the holding ring 10 having therein the waterproof protection glass 7 is screwed and fastened in the female screw 15f of the lens opening 35a. As a result, the O-ring 9 is depressed against the close contact wall portion 15d by the rear surface of the protection glass 7 to establish a watertight connection of the taking lens 35.

The movable lens barrel 15 which can be made of metal is preferably machined to obtain a high dimensional precision including a roundness thereof and a high surface hardness, etc., in view of the waterproof property.

In the illustrated embodiment, as mentioned above, since the tubular member 8 which holds the front lens unit 1 and the O-ring 9 is made separately from the movable lens barrel 15, if the movable lens barrel 15 is machined from metal, it is possible to make the tubular member 8 of synthetic resin or the like to easily manufacture and lighten the taking lens 35. Furthermore, due to the provision of the independent tubular member 8 from the movable lens barrel 15, it is possible to easily label a trade mark or trade name etc., on the tubular member 8.

As can be understood from the above discussion, according to the present invention, since the elastic waterproof ring is provided between the inner peripheral flange formed on the lens barrel and the waterproof ring holding member (tubular member) which is made separately from the lens barrel and which is detachably mounted to the inner surface of the inner peripheral flange of the lens barrel, the taking lens can be easily uncovered at the front end of the taking lens even after the camera assembly is completed, so that, for example, a fine adjustment of the internal mechanism of the camera can be easily carried out.

Although the invention has been described with reference to particular means, materials and embodiments, it is to be understood that the invention is not limited to the particulars disclosed and extends to all equivalents within the scope of the claims.

I claim:

1. A waterproof lens comprising;
   a lens barrel having an inner peripheral flange;
   a lens frame located within said lens barrel;
   a tubular member which occupies a space between said inner peripheral flange and said lens frame and which is detachably mounted to said inner flange;
   a transparent member positioned in front of said inner peripheral flange and said tubular member; and
   means for sealing the transparent member and the inner peripheral flange in a watertight manner.

2. A waterproof lens according to claim 1, wherein said sealing means comprises an elastic waterproof ring which is positioned between the transparent member and the inner peripheral flange, and which contacts an outer peripheral surface of said tubular member.

3. A waterproof lens according to claim 2, wherein said transparent member depresses the elastic waterproof ring against said inner peripheral flange.

4. A waterproof lens according to claim 1, further comprising a holding ring which is screw-engaged by the front end of the lens barrel.

5. A waterproof lens according to claim 4, wherein said transparent member comprises a waterproof protection glass which is held by the holding ring and is depressed against the elastic waterproof ring.

6. A waterproof lens according to claim 5, wherein said lens frame is a front lens frame which holds a focusing lens group.

7. A waterproof lens according to claim 6, wherein said front lens frame is screw engaged with an AF/AE unit which is secured in said lens barrel, said AF/AE unit having an AF driving lever which is actuated to rotate the front lens frame.

8. A waterproof lens according to claim 7, wherein the inner diameter of said inner flange of the lens barrel is adapted to receive a focus adjusting jig, whereby said focus adjusting jig adjusts a relative rotational position between said AF driving lever and said front lens frame.

9. A waterproof lens according to claim 1, wherein said tubular member includes a light intercepting portion for intercepting light in a space between the lens barrel and the lens frame when the tubular member is mounted to the inner peripheral flange of the lens barrel.

10. A waterproof lens according to claim 9, wherein said tubular member further includes an outer surface spaced from inner surface of said lens barrel, said elastic waterproof ring being fitted to the space.

11. A waterproof lens according to claim 1, wherein said lens barrel is a movable lens barrel, said movable lens barrel being accommodated in an immovable lens barrel of a camera body so as to move relative to said immovable lens barrel.

12. A waterproof lens comprising;
- a transparent member which is mounted to front end of a lens barrel through an elastic water seal ring in a water-tight fashion, said lens barrel being provided with an inner peripheral flange;
- a tubular member which is detachably mounted to the inner peripheral flange of the lens barrel and which is made separately from the lens barrel, said elastic water seal ring being held between the tubular memoer and the inner peripheral flange of the lens barrel.

13. A waterproof lens according to claim 12, further comprising a holding ring which is screw-engaged by the front end of the lens barrel.

14. A waterproof lens according to claim 13, wherein said transparent member is made of a waterproof protection glass which is held by the holding ring and which is depressed against the elastic waterproof ring.

15. A waterproof lens according to claim 14, further comprising a front lens frame which holds a front lens unit, said front lens frame being provided on the outer peripheral surface thereof with an engaging groove, said engaging groove being fitted with a connecting ring at a predetermined holding force.

16. A waterproof lens according to claim 15, further comprising an AF/AE unit having an AF driving lever which is actuated to rotate the connecting ring about the optical axis to drive the front lens unit in the forward optical axis direction of the lens barrel.

17. A waterproof lens according to claim 16, wherein when the tubular member is removed together with the transparent member, the front lens frame can be rotated by a focus adjusting jig, whereby said focus adjusting jig is adapted to be inserted in the lens barrel from the front thereof to exert a rotational force on the lens barrel larger than the predetermined holding force.

18. A waterproof lens according to claim 17, wherein said tubular member includes a light intercepting portion for intercepting light in a space between the lens barrel and the lens frame when the tubular member is mounted to the inner peripheral flange of the lens barrel, and wherein said tubular member further includes an outer surface on which the elastic waterproof ring can be fitted.

19. A waterproof lens according to claim 18, wherein said lens barrel is a movable lens barrel, said movable lens barrel being accommodated in an immovable lens barrel of a camera body so as to move relative to said immovable lens barrel.

20. A waterproof lens comprising:
- a lens barrel having an inner peripheral flange;
- a lens frame located within said lens barrel;
- a tubular member which occupies a space between said inner peripheral flange and said lens frame and which is detachably mounted to said inner flange;
- an elastic waterproof ring which contacts an outer peripheral surface of said tubular member; and,
- a transparent member which depresses the waterproof ring against said inner peripheral flange.

* * * * *

UNITED STATES PATENT AND TRADEMARK OFFICE
CERTIFICATE OF CORRECTION

PATENT NO. : 5,305,145
DATED      : April 19, 1994
INVENTOR(S): Hitoshi Tanaka,

It is certified that error appears in the above-indentified patent and that said Letters Patent is hereby corrected as shown below:

Column 7, line 23 (claim 10, line 4), change "to" to ---into---.
Column 7, line 30 (claim 12, line 2), change "to front" to ---to a front---.
Column 7, line 38 (claim 12, line 10), change "memoer" to ---member---.

Signed and Sealed this

Fourteenth Day of March, 1995

Attest:

BRUCE LEHMAN

Attesting Officer

Commissioner of Patents and Trademarks